United States Patent
McKinney et al.

(10) Patent No.: US 10,661,500 B1
(45) Date of Patent: May 26, 2020

(54) HYDRAULIC METHOD FOR FUSED DEPOSITION MODELING

(71) Applicant: NORTHROP GRUMMAN SYSTEMS CORPORATION, Falls Church, VA (US)

(72) Inventors: Kenneth F. McKinney, San Diego, CA (US); Andrew Simmons, San Diego, CA (US); Kenneth Weidele, San Diego, CA (US); Tim Manestitaya, San Diego, CA (US); Alex Grammar, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 488 days.

(21) Appl. No.: 15/419,783

(22) Filed: Jan. 30, 2017

(51) Int. Cl.
*B29C 64/106* (2017.01)
*B33Y 30/00* (2015.01)
*B29K 105/00* (2006.01)

(52) U.S. Cl.
CPC ............ *B29C 64/106* (2017.08); *B33Y 30/00* (2014.12); *B29K 2105/0067* (2013.01)

(58) Field of Classification Search
None
See application file for complete search history.

(56) References Cited

U.S. PATENT DOCUMENTS

| | | |
|---|---|---|
| 3,016,451 A | 1/1962 | Cornell, Jr. |
| 5,529,652 A | 6/1996 | Asai et al. |
| 5,764,521 A | 6/1998 | Batchelder et al. |
| 5,900,207 A | 5/1999 | Danforth et al. |
| 7,896,209 B2 | 3/2011 | Batchelder et al. |
| 7,897,074 B2 | 3/2011 | Batchelder et al. |
| 8,236,227 B2 | 8/2012 | Batchelder et al. |
| 8,439,665 B2 | 5/2013 | Batchelder et al. |
| 8,926,882 B2 | 1/2015 | Batchelder et al. |
| 9,050,753 B2 | 6/2015 | Rodgers et al. |
| 9,321,609 B2 | 4/2016 | Koop et al. |
| 2009/0295032 A1 | 12/2009 | Hopkins |
| 2011/0186081 A1* | 8/2011 | Dunn ...................... B08B 3/045 134/18 |
| 2012/0046779 A1* | 2/2012 | Pax ....................... B29C 64/106 700/112 |
| 2013/0073073 A1* | 3/2013 | Pettis .................... B29C 64/106 700/119 |
| 2013/0292881 A1* | 11/2013 | Steiner .................. B33Y 40/00 264/401 |

(Continued)

OTHER PUBLICATIONS

Simmons, Andrew, U.S. Appl. No. 15/345,289, filed Nov. 7, 2016, entitled "Helical Filament Feed Mechanism for Fused Deposition Modeling".

*Primary Examiner* — Jacob T Minskey
*Assistant Examiner* — Baileigh Kate Darnell
(74) *Attorney, Agent, or Firm* — Shumaker, Loop & Kendrick, LLP; John A. Miller

(57) ABSTRACT

A feed mechanism for feeding a filament into a print head assembly in an FDM printer. The feed mechanism includes a drive assembly that drives the filament into a reservoir where the reservoir is heated by a heater, where the filament is liquefied therein. A pump in the reservoir pumps the liquefied filament material out of the reservoir through an extrusion nozzle to a print head of the printer.

15 Claims, 2 Drawing Sheets

(56) References Cited

U.S. PATENT DOCUMENTS

| | | | |
|---|---|---|---|
| 2013/0313743 A1* | 11/2013 | Rockhold | B29C 67/0088 264/40.1 |
| 2015/0077215 A1* | 3/2015 | Ranky | B29C 70/88 338/47 |
| 2015/0084222 A1 | 3/2015 | Heston et al. | |
| 2015/0352789 A1* | 12/2015 | Haider | B33Y 30/00 264/129 |
| 2016/0031159 A1 | 2/2016 | Church et al. | |

* cited by examiner

HYDRAULIC METHOD FOR FUSED DEPOSITION MODELING

BACKGROUND

Field

This invention relates generally to a feed mechanism for feeding a filament through a print head in a fused deposition modeling (FDM) printer and, more particularly, to a feed mechanism for feeding a filament into a nozzle in a print head of an FDM printer, where the feed mechanism includes a heater that heats and liquefies the filament and a pump that pumps the liquefied filament through an extrusion nozzle.

Discussion

Fused deposition modeling (FDM) is an additive manufacturing (AM) technology and is a technique used for 3D printing. More specifically, FDM is a process where a material is laid down layer by layer from a spool of material that is fed into a heated nozzle as a filament to build a desired product. The material from the spool is fed into the heated nozzle, which causes the material to become molten, where the molten material immediately begins to harden once it is extruded from the nozzle. A typical filament for these types of printers will have a diameter of 1.75 mm or 3 mm. FDM utilizes software that processes a stereolithography file (STL) file and includes mathematically slicing and orienting the model to build up the product layer by layer. Support structures may also be built layer by layer using a second spool of material, for example, a soluble material may be provided to build a soluble support structure.

Various materials may be used for FDM, such as acrylonitrile butadiene styrene (ABS), polylactic acid (PLA), polycarbonate (PC), polyamide (PA), polystyrene (PS), lignin, rubber, carbon fibers, thermoplastics, polyphenylsufone, ultra high molecular weight polyethylene (UHMWPE) Dyneema, Ultem 9085, high impact polystyrene (HIPS), nylon, high density polyethylene (HDPE) eutectic materials, plasticine, room temperature vulcanization (RTV) silicone, etc. Typically the material is selected to increase the structural properties of the printed products that are made therefrom.

Some printing filaments have additional materials added to provide different electrical, mechanical and/or cosmetic properties. Some of these additives can dramatically increase the thermal conductivity of the filament. During the printing process, the hot end of the printer will heat the filament, where heat will move through the filament towards the source of the filament. For filaments with a high thermal conductivity, this heat transfer can cause the filament entering the printer to approach its glass transition temperature, which softens the filament and reduces the effectiveness of the feed mechanism.

A feed mechanism is employed in a print head assembly of the FDM printer that feeds the filament to the nozzle from which it is extruded. The distance between the feed mechanism and the nozzle varies from printer to printer, and can be, for example, in the range of 75 mm-1 m. It is critical that the feed mechanism feeds the filament into the nozzle at a constant rate so that the heated material is properly laid down to form the product. The feed rate is generally a function of the temperature of the nozzle and the force applied by the feed mechanism to the filament. The ability of the feed mechanism to properly feed the filament to the nozzle is also often highly reliant on the type of material being fed. For some materials it is not uncommon that the filament gets jammed within the feed mechanism and is prevented from being provided to the nozzle, possibly a result of the nozzle being at a too low of temperature or the filament buckling between the feed mechanism and the nozzle. Further, heat can be transferred from the nozzle up the filament as it is being fed, possibly causing the filament to approach its glass transition temperature where it begins to melt prior to it reaching the nozzle, which could plug up the nozzle. Typically, what happens is that a feed failure causes the filament to break or be prevented from being extruded by the nozzle, where the machine does not detect this failure and continues with its print routine.

A typical feed mechanism for an FDM printer employs a roller bearing and a drive gear, where the drive gear drives the filament by applying pressure against the roller bearing. More specifically, the roller bearing provides a radial force on the filament as it is being driven by the drive gear. It is believed that this type of feed mechanism is a major contributing factor to feed failures because the force on the filament that drives it to the nozzle is a point source at the location where the drive gear contacts the filament, which is not at the center of the filament, and which causes a bending moment to be applied to the filament. Further, the contact pressure of the drive gear on the filament sometimes operates to remove material from the filament, thus reducing the contact force on the filament that drives the filament into the nozzle.

SUMMARY

The present invention discloses and describes a feed mechanism for feeding a filament into a print head assembly in an FDM printer. The feed mechanism includes a drive assembly that drives the filament into a reservoir where the reservoir is heated by a heater, where the filament is liquefied therein. A pump in the reservoir pumps the liquefied filament material out of the reservoir through an extrusion nozzle to a print head of the printer.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a feed mechanism for an FDM printer is merely exemplary in nature, and is in no way intended to limit the invention or its applications or uses.

Figure 1:
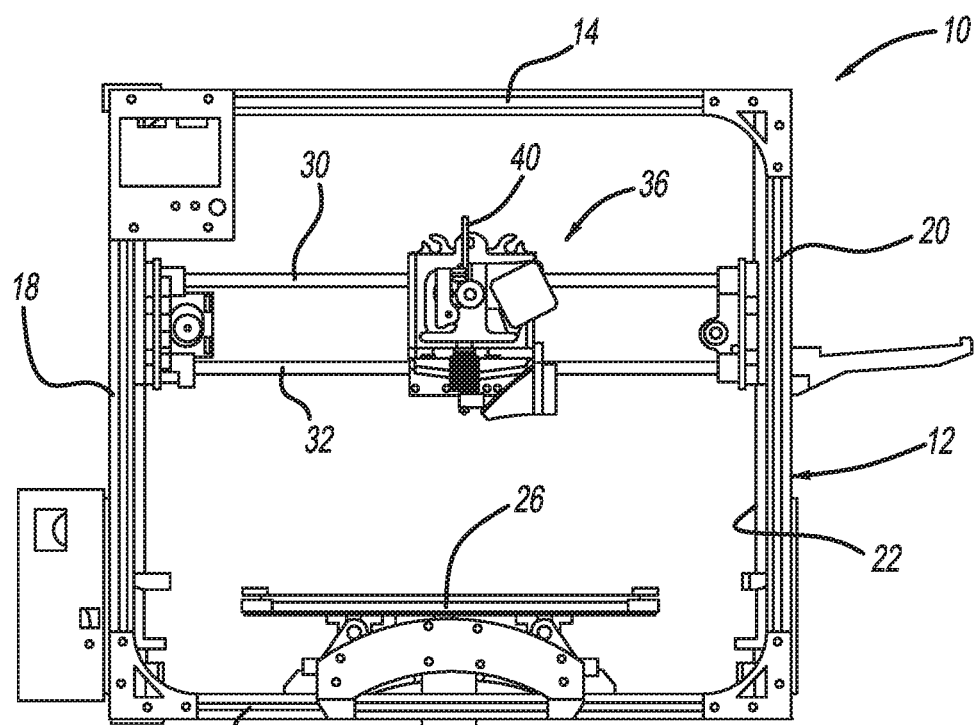
FIG. 1 is front view of an FDM printer.

FIG. 1 is a front view of a known FDM printer 10 of the type generally discussed above. It is noted that the specific configuration of the printer 10 is provided for general discussion purposes only in that the feed mechanism of the invention discussed in detail below can be employed in other FDM printers having different designs and configurations. The printer 10 includes an outer support structure 12 having top and bottom support members 14 and 16 and side support members 18 and 20 defining an enclosure 22. A movable platform 26 on which the component (not shown) being printed will be deposited in a layered configuration is positioned on the bottom member 16 within the enclosure 22. A pair of parallel rails 30 and 32 is mounted to the side members 18 and 20 and extends across the enclosure 22 in any suitable manner.

Figure 2:
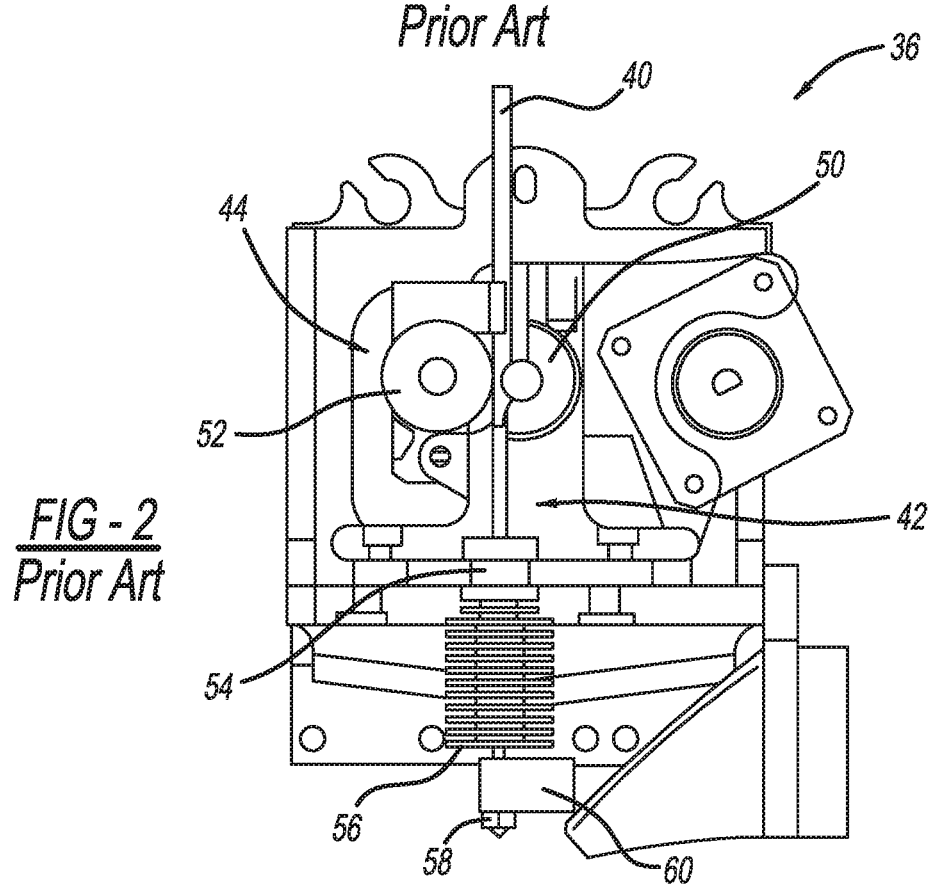
FIG. 2 is a front view of a print head removed from the printer shown in FIG. 1.

A print head 36 is slidably mounted to the rails 30 and 32 so as to be controllably positioned along the rails 30 and 32 relative to the platform 26. FIG. 2 is a front view of the print head 36 separated from the printer 10, where some of the parts of the print head 36 have been removed for clarity purposes. A filament 40 is drawn into a print head assembly 42 in the print head 36 from, for example, a spool (not shown) of the filament material by a feed mechanism 44 positioned in the print head assembly 42. The feed mechanism 44 includes a drive gear 50 and a roller bearing 52 that draws the filament 40 through a feed channel 54, then through a heat sink 56 and into a nozzle 58 that is heated by a heat source 60. The heated filament material is then extruded by the nozzle 58 so that it is laid down on the platform 26 in a configuration that is controlled by the position of the print head 36 on the rails 20 and 22 and the orientation of the platform 26 in a manner well understood by those skilled in the art.

Figure 3:
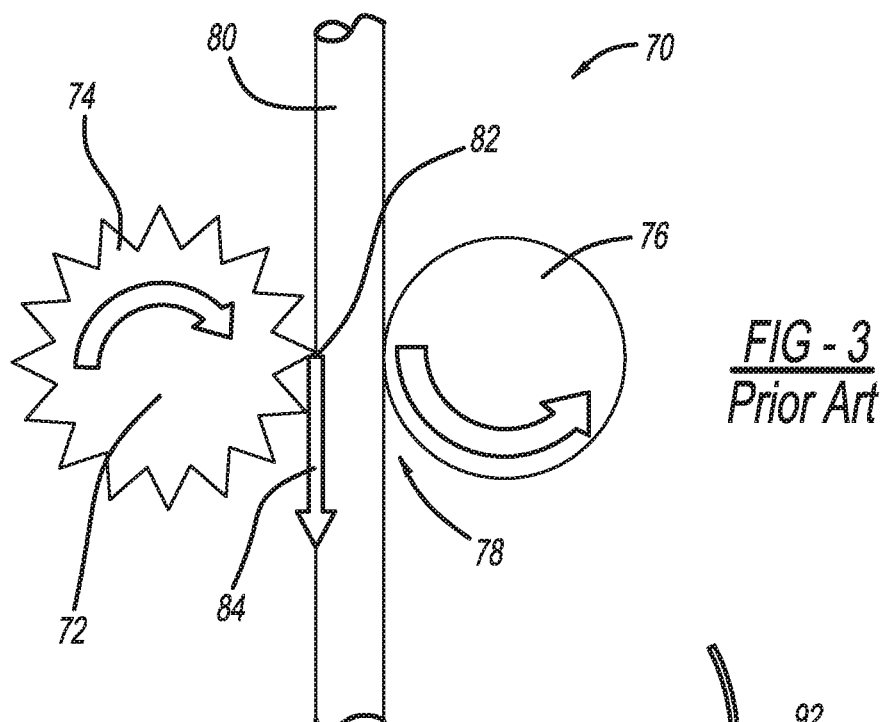
FIG. 3 is an illustration of a known feed mechanism employed in the print head shown in FIG. 2.

FIG. 3 is an illustration of a feed mechanism 70 that is similar to the feed mechanism 44 to better illustrate the operation of the feed mechanism 44. The feed mechanism 70 includes a drive gear 72 having gear teeth 74 and a roller bearing 76 defining a space 78 therebetween. A filament 80 is drawn through the feed mechanism 70 by the gear 72 by applying pressure to a side of the filament 80 against the bearing 76. Because the pressure applied by the gear 72 causes a point source load against the filament 80 at location 82, and which creates a force off-set from the center of the filament 80, as represented by arrow 84, the issues with filament buckling and the like discussed above are created.

The present invention proposes replacing the feed mechanism 44 in the print head assembly 42 with a different type of feed mechanism that prevents filament buckling and offers increased feed reliability. As will be discussed, instead of heating the filament 40 to make it pliable to be extruded out of an extrusion nozzle, the proposed feed mechanism actually liquefies the filament 40, which is delivered to the print head 36 in the liquefied state.

Figure 4:
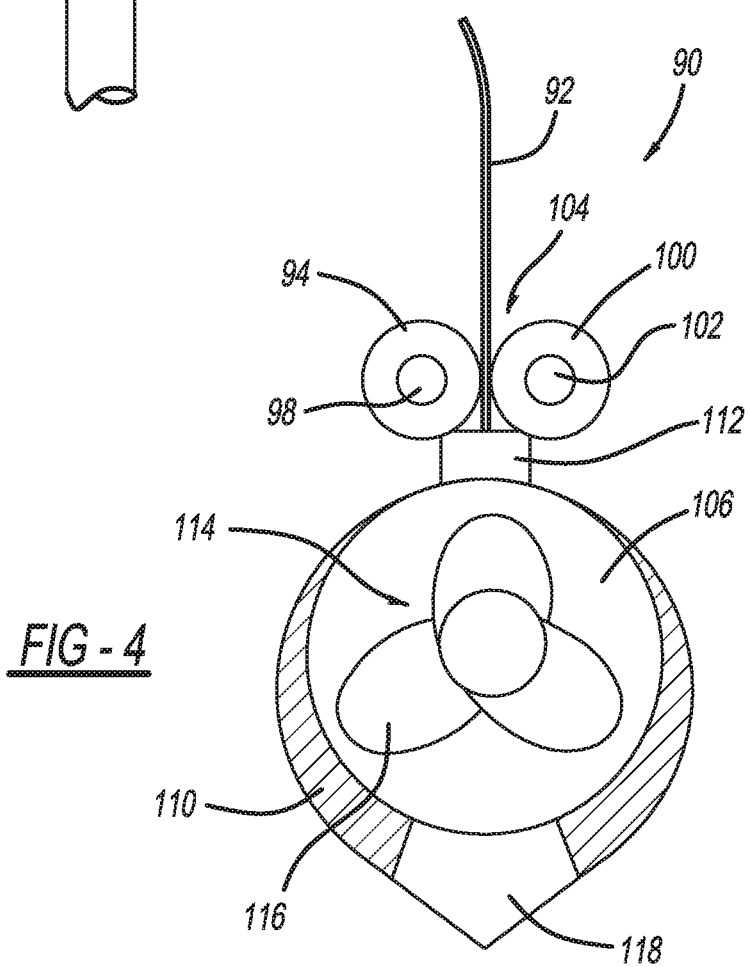
FIG. 4 is an illustration of feed mechanism including a heater that liquefies a filament that can replace the feed mechanism shown in FIG. 3 in the print head.

FIG. 4 is an illustration of a feed mechanism 90 that receives a filament 92 of the type discussed above that is the printing material for the print head 36. The feed mechanism 90 includes a drive assembly 104 having a first circular drive element 94 rotatable on an axle 98 and a second circular drive element 100 rotatable on an axle 102, where a space is defined therebetween. Any suitable configuration of drive elements in the assembly 104 can be employed for the purpose discussed herein, such as that shown in FIG. 3. The filament 92 is inserted in the space between the drive elements 94 and 100 and in contact therewith, where rotation of the drive elements 94 and 100 on the axels 98 and 102, respectively, by a suitable motor (not shown) draws the filament 92 into a reservoir 106. The feed mechanism 90 includes a heating element 110, such as a resistive heater, positioned in contact with the reservoir 106 that heats the reservoir 106 to a temperature that liquefies the filament 92 therein. Any heating element suitable for the purposes discussed herein can be employed. The heating element 110 can be temperature controlled for different filament materials. A thermal isolation element 112 thermally isolates the reservoir 106 from the drive assembly 104 so that the filament 92 does not become too pliable to be driven. A pump 114, here a rotary pump including three blades 116, is positioned within the reservoir 106 and is rotated at the desired speed so that the liquefied filament material in the reservoir 106 is forced out of an extrusion nozzle 118 to the print head 36 for the printing process.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A feed mechanism for feeding a printing material through a print head assembly in a fusion deposition modeling (FDM) printer, said feed mechanism comprising:
   a heater for heating and liquefying the printing material;
   a reservoir for holding the liquefied printing material;
   a pump positioned within the reservoir and pumping the liquefied printing material out of the reservoir under pressure, wherein the pump is a rotary pump including a plurality of blades; and
   an extrusion nozzle receiving the liquefied printing material from the reservoir to be printed by the print head assembly.

2. The feed mechanism according to claim 1 wherein the printing material is provided as a filament to the heater.

3. The feed mechanism according to claim 2 further comprising a drive assembly including opposing circular drive elements for driving the filament to the heater.

4. The feed mechanism according to claim 3 further comprising a thermal isolation device provided between the heater and the drive assembly.

5. The feed mechanism according to claim 1 wherein the heater is positioned in contact with the reservoir and the printing material is liquefied in the reservoir.

6. The feed mechanism according to claim 1 wherein the heater is a resistive heater.

7. A feed mechanism for feeding a printing material through a print head assembly in a fusion deposition modeling (FDM) printer, said feed mechanism comprising:
   a drive assembly including opposing circular drive elements for driving a filament of the printing material;
   a reservoir receiving the filament from the drive assembly;
   a heater positioned in contact with the reservoir and heating the reservoir to liquefy the filament;
   a pump positioned within the reservoir and pumping the liquefied printing material out of the reservoir under pressure, wherein the pump is a rotary pump including a plurality of blades; and
   an extrusion nozzle receiving the liquefied printing material from the reservoir to be printed by the print head assembly.

8. The feed mechanism according to claim 7 further comprising a thermal isolation device provided between the reservoir and the drive assembly.

9. The feed mechanism according to claim 7 wherein the heater is a resistive heater.

10. A fusion deposition modeling (FDM) printer, said printer comprising a print head assembly including a feed mechanism for feeding a printing material through the print head assembly, said feed mechanism including a heater for heating and liquefying the printing material, a reservoir for holding the liquefied printing material, a pump positioned within the reservoir and pumping the liquefied printing material out of the reservoir under pressure, and an extrusion nozzle receiving the liquefied printing material from the reservoir to be printed by the print head assembly, wherein the pump is a rotary pump including a plurality of blades.

11. The FDM printer according to claim 10 wherein the printing material is provided as a filament to the heater.

12. The FDM printer according to claim 11 further comprising a drive assembly including opposing circular drive elements for driving the filament to the heater.

13. The FDM printer according to claim 12 further comprising a thermal isolation device provided between the heater and the drive assembly.

14. The FDM printer according to claim 10 wherein the heater is positioned in contact with the reservoir and the printing material is liquefied in the reservoir.

15. The FDM printer according to claim 10 wherein the heater is a resistive heater.

* * * * *